US007290350B2

(12) United States Patent
Lee

(10) Patent No.: US 7,290,350 B2
(45) Date of Patent: Nov. 6, 2007

(54) DEVICES, SYSTEMS, AND METHODS FOR FRAMING

(76) Inventor: Jerry Lee, 2878 Country Rd. 3525, Dike, TX (US) 75437

( * ) Notice: Subject to any disclaimer, the term of this patent is extended or adjusted under 35 U.S.C. 154(b) by 320 days.

(21) Appl. No.: 11/177,783

(22) Filed: Jul. 8, 2005

(65) Prior Publication Data

US 2006/0065092 A1 Mar. 30, 2006

Related U.S. Application Data

(60) Provisional application No. 60/591,297, filed on Jul. 26, 2004.

(51) Int. Cl.
*G01D 21/00* (2006.01)
*B27C 5/00* (2006.01)

(52) U.S. Cl. ............................ 33/640; 33/562; 33/452; 144/144.1; 144/144.51; 409/130

(58) Field of Classification Search .................. 33/640, 33/641, 642, 644, 1 G, 562, 452, 464, 194, 33/482; 144/144.1, 144.5, 144.51, 144.52, 144/145.1, 371, 372; 409/125, 130
See application file for complete search history.

(56) References Cited

U.S. PATENT DOCUMENTS 3,450,001 A * 6/1969 Fortune ...................... 409/130
3,635,396 A * 1/1972 Palfi .......................... 235/70 R
3,985,168 A * 10/1976 Lundquist .............. 144/144.52
4,062,123 A * 12/1977 Lundquist ................... 409/130
4,478,016 A * 10/1984 Allen ......................... 52/126.1
4,599,805 A * 7/1986 Padilla ......................... 33/464
4,936,176 A * 6/1990 Silverman ..................... 83/468
5,215,134 A * 6/1993 Gudeman ................ 144/144.1
5,345,986 A * 9/1994 Kieffer ........................ 144/372
5,533,556 A * 7/1996 Whitney ................ 144/144.52
5,692,357 A * 12/1997 McCain ...................... 52/749.1
5,771,767 A * 6/1998 Itami ........................ 83/435.13
6,176,281 B1 * 1/2001 Newman ............... 144/144.51
7,007,731 B2 * 3/2006 Chiu et al. .................. 144/372
7,069,659 B1 * 7/2006 Rye ............................. 33/194

* cited by examiner

*Primary Examiner*—G. Bradley Bennett
*Assistant Examiner*—Amy R. Cohen
(74) *Attorney, Agent, or Firm*—Steven Thrasher

(57) ABSTRACT

The invention is adapted particularly for simplifying the difficult task of measuring the openings of picture frame mats, and then transferring those measurements to a mitering machine for the purpose of accurately cutting, to the proper length, a piece of picture frame fillet molding. The invention includes at least a generally rectangular body, comprising a top plate and a base plate. A slide mechanism is slideably mated to the top plate by means of a male dovetail, which mates with the matching female dovetail. In addition, the slide mechanism is mated to the top plate by introducing the side of top plate into the slot of the slide.

6 Claims, 11 Drawing Sheets

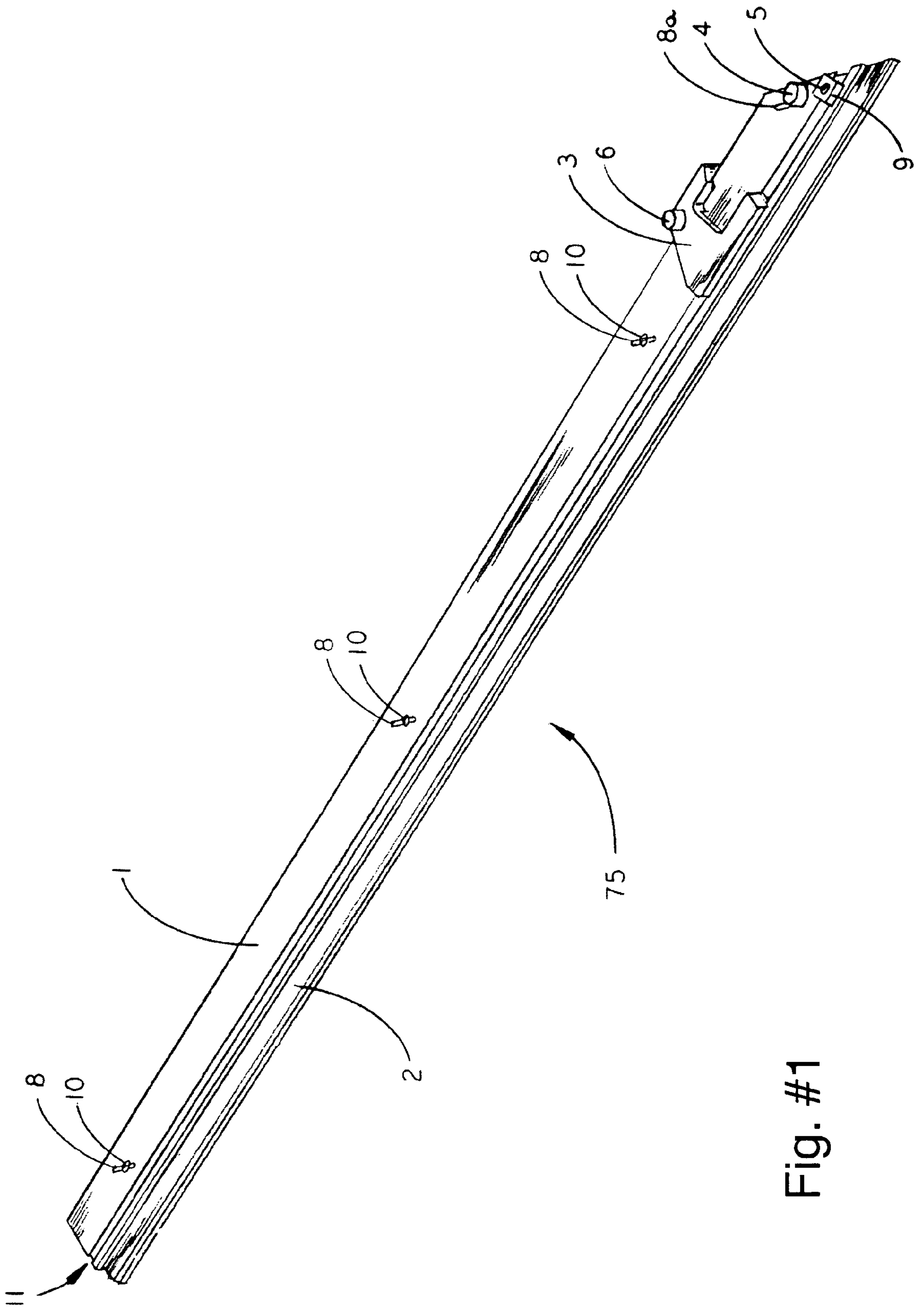
Fig. #1

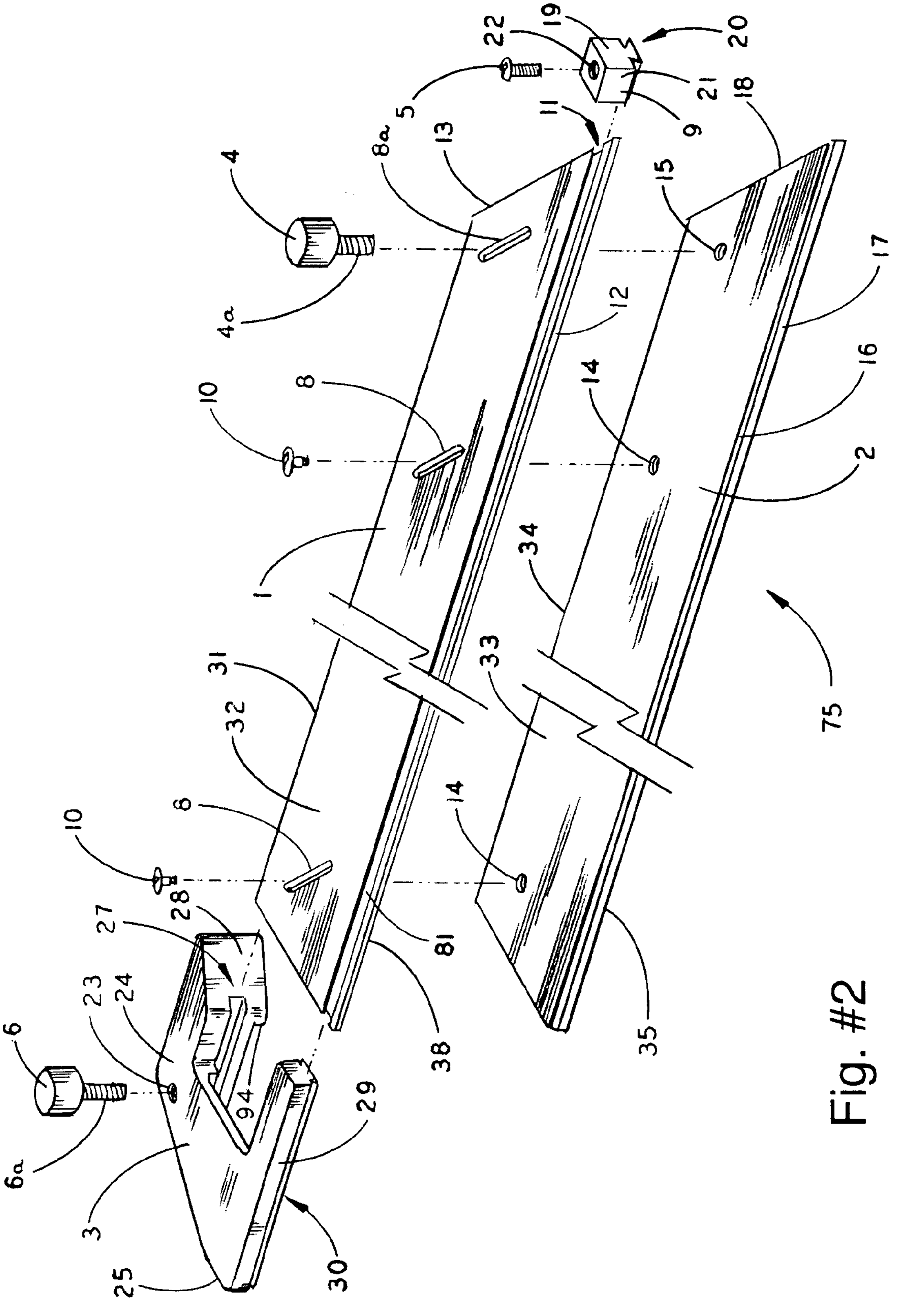
Fig. #2

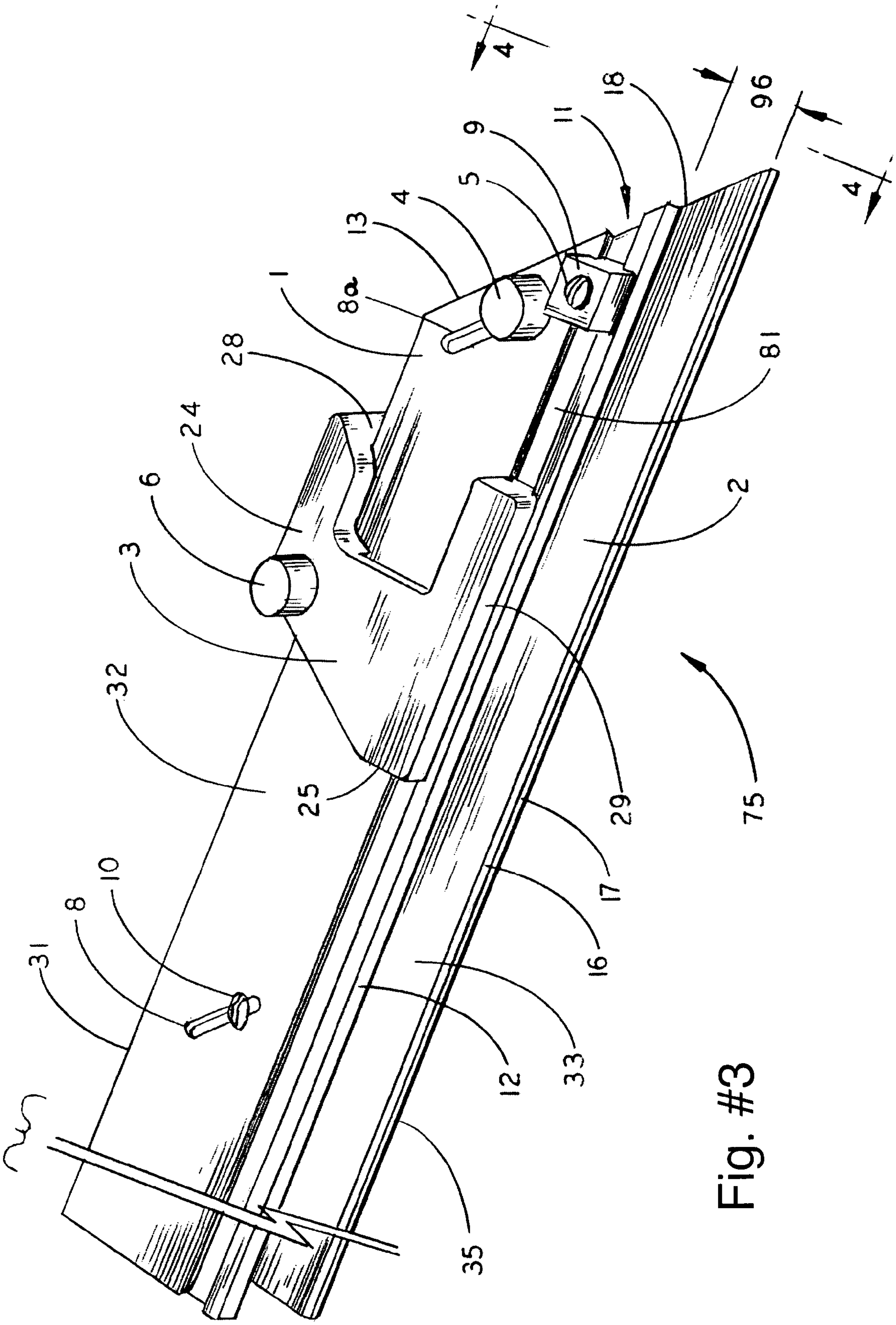
Fig. #3

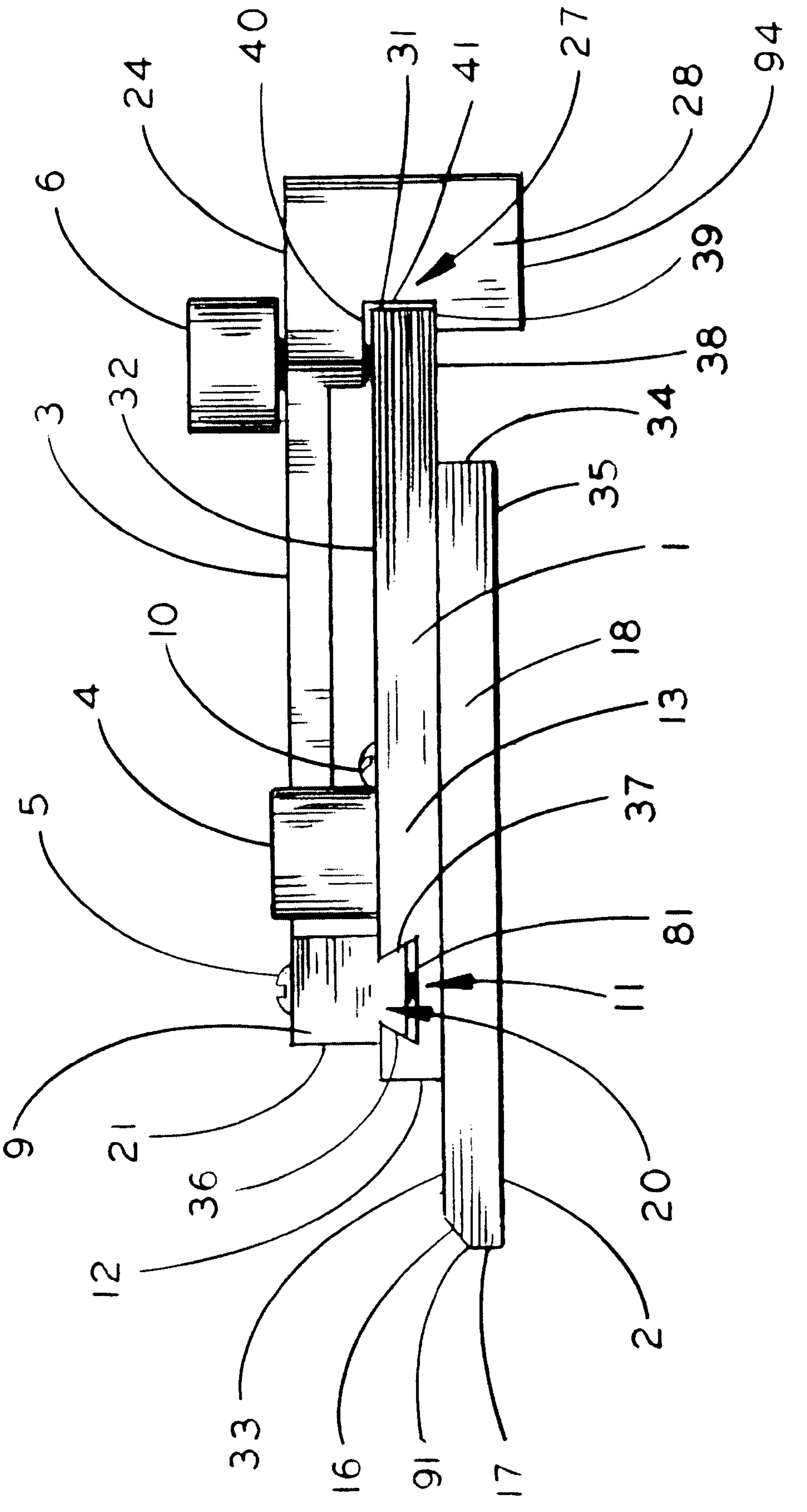
Fig. #4

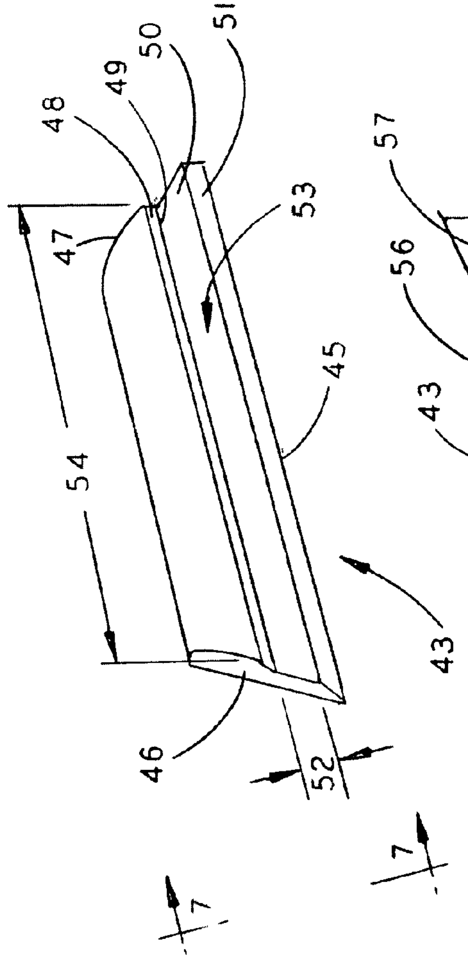
Fig. #5
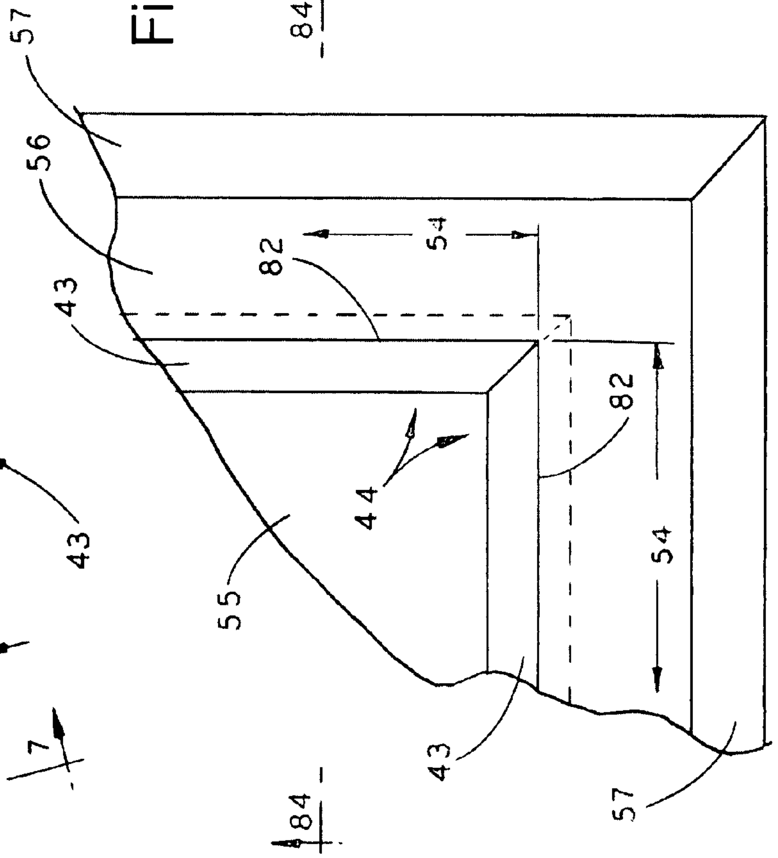
Fig. #6
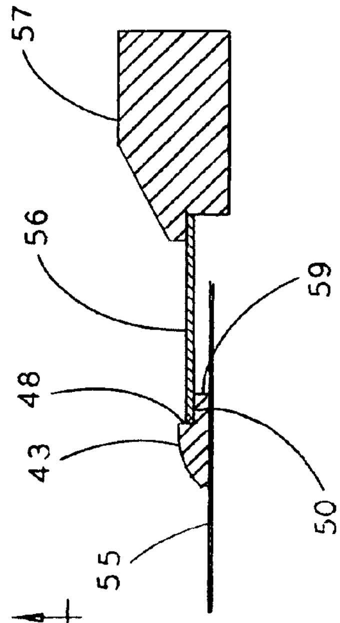
Fig. #7

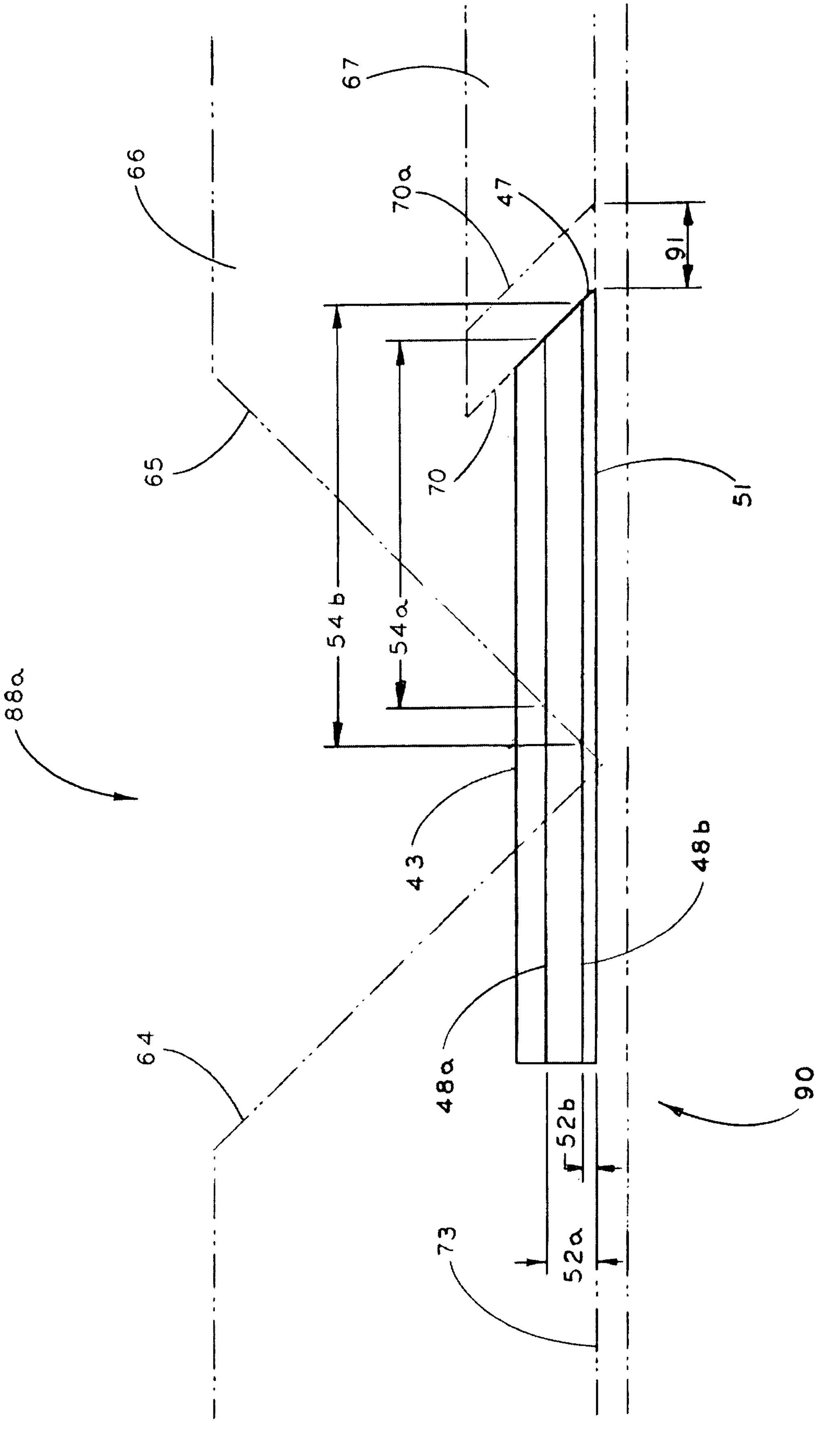
Fig. #5A

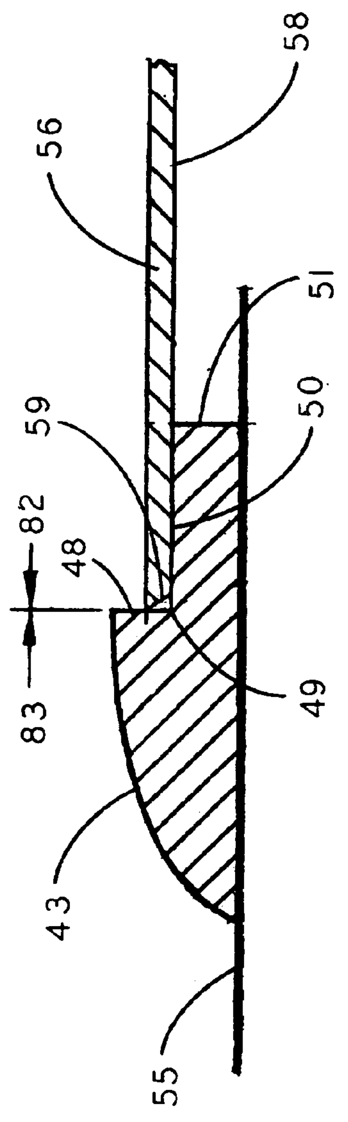
Fig. #8
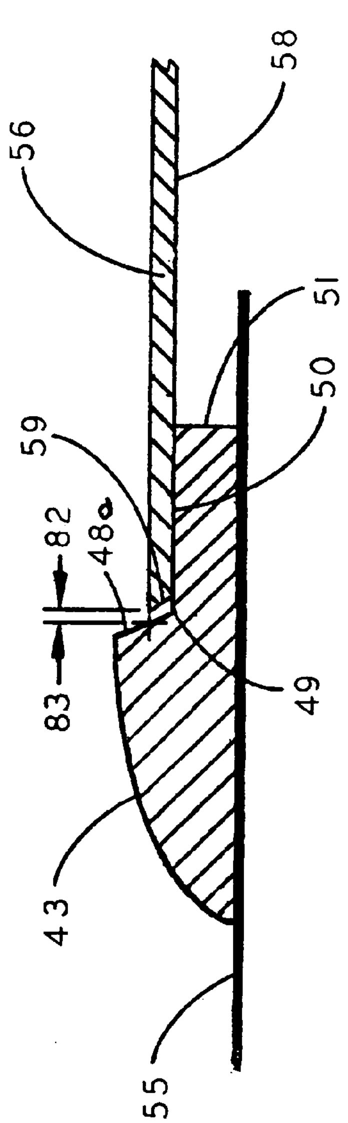
Fig. #9
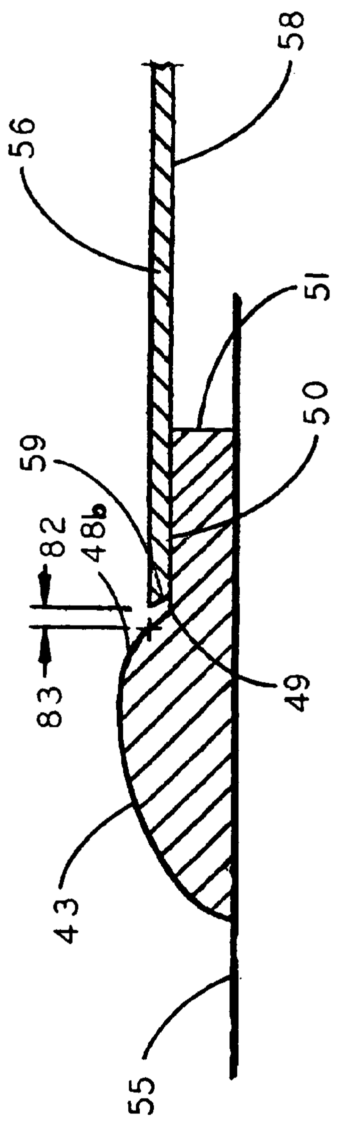
Fig. #10

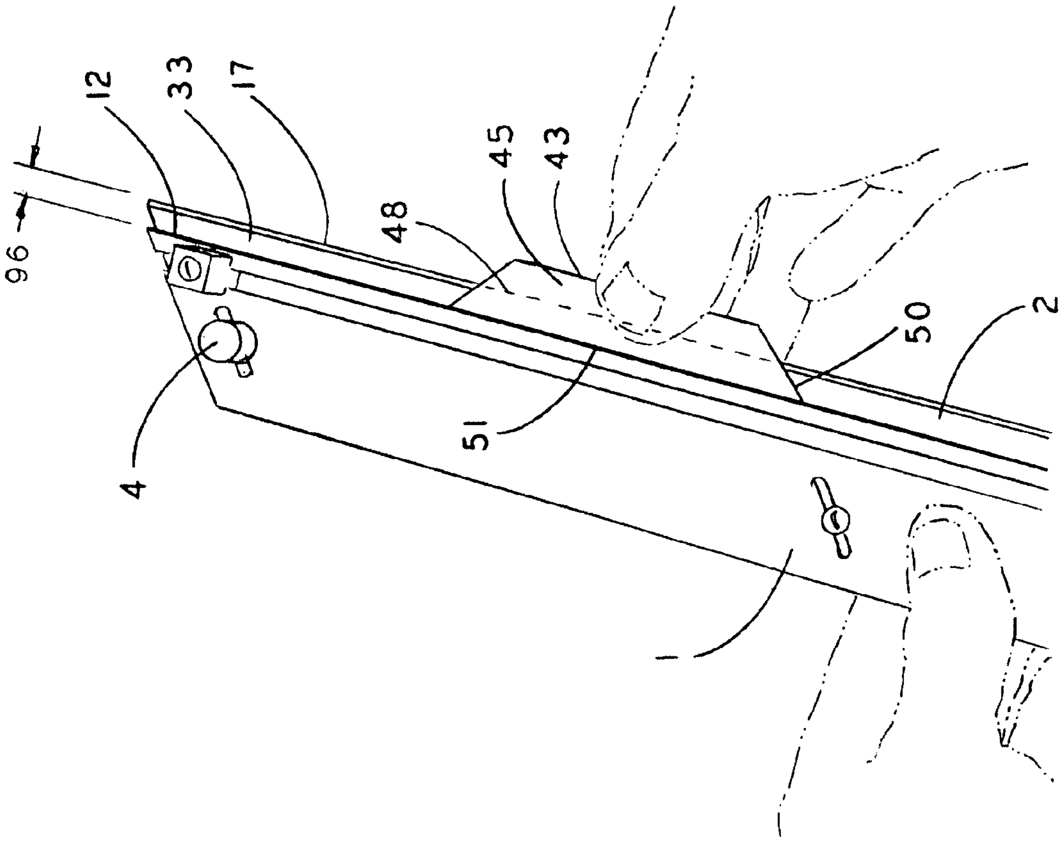
Fig. #11
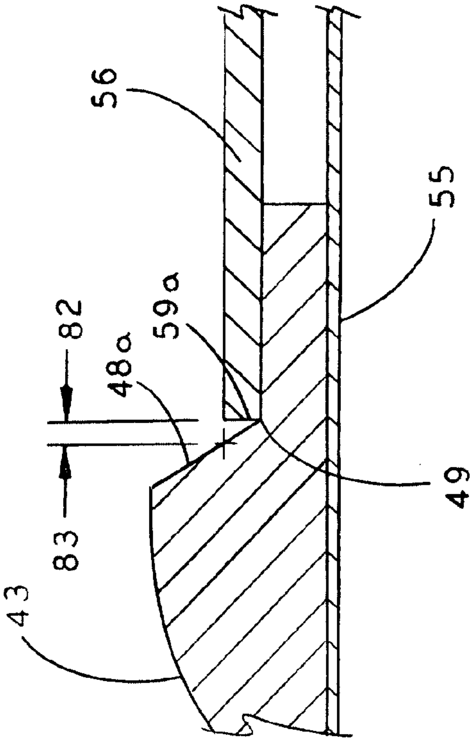
Fig. #9A

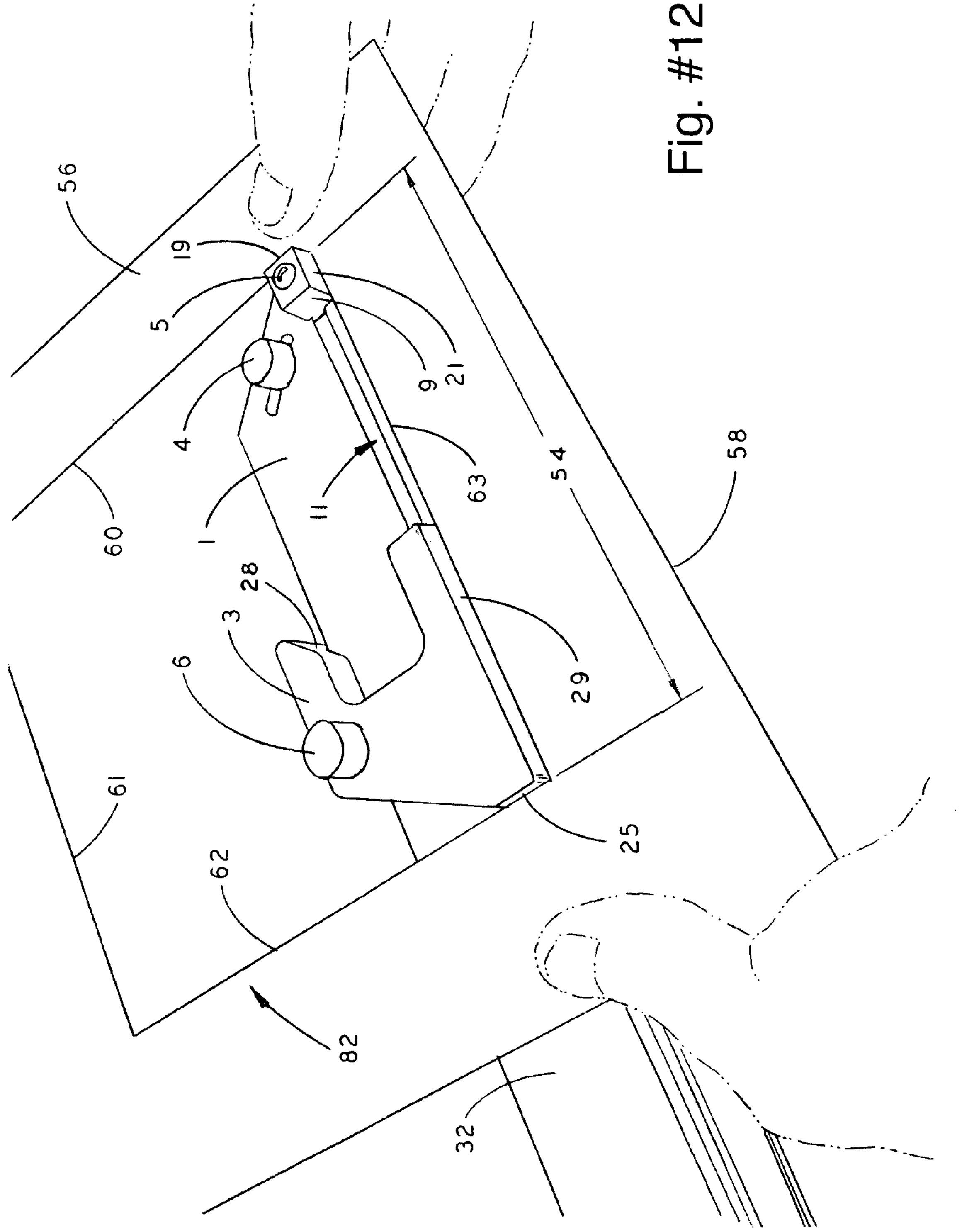
Fig. #12

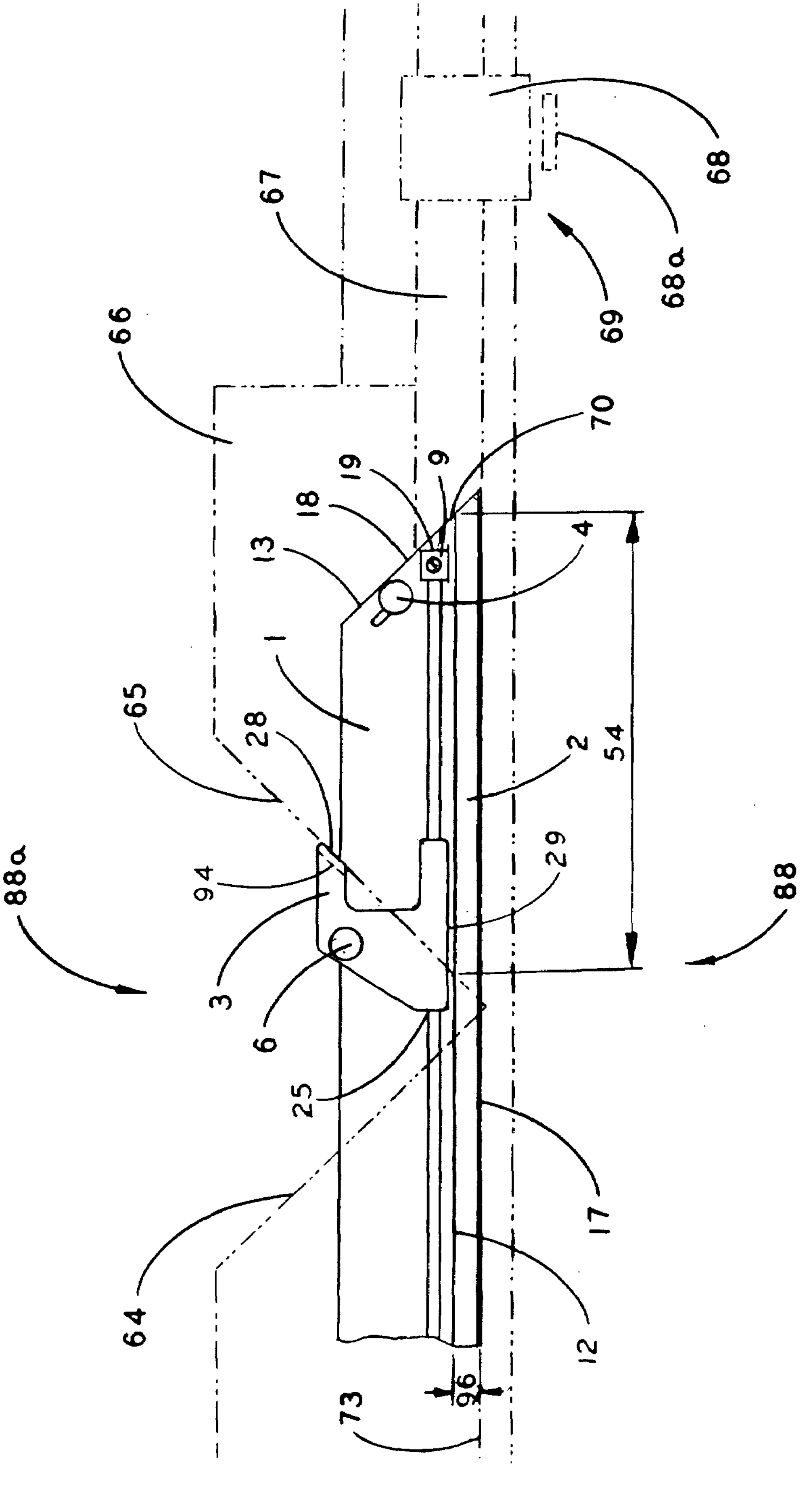
Fig. #13

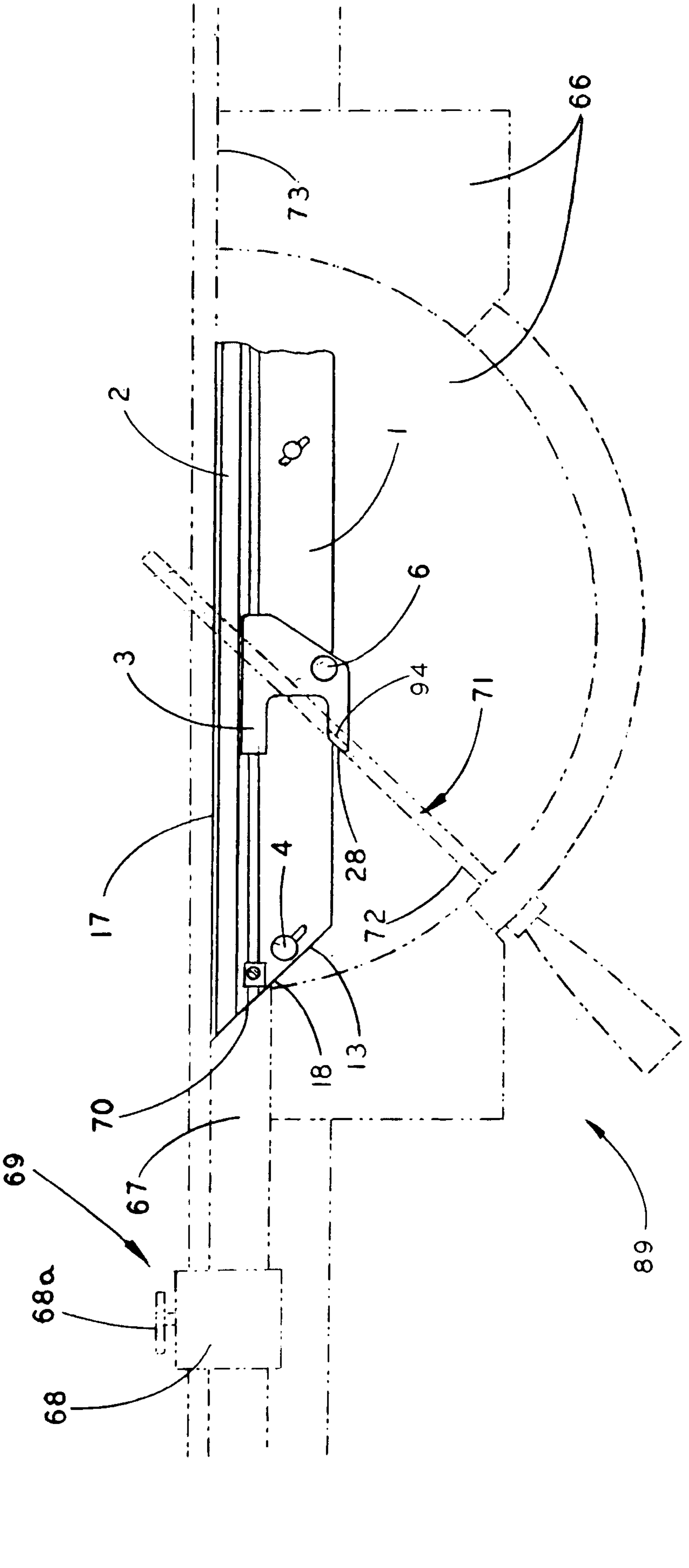
Fig. #14

DEVICES, SYSTEMS, AND METHODS FOR FRAMING

CROSS REFERENCE TO RELATED APPLICATIONS

The invention is related to and claims priority from U.S. Provisional Patent Application No. 60/591,297, filed on Jul. 26, 2004, by Jerry Lee, and entitled DEVICES, SYSTEMS, AND METHODS FOR FRAME.

TECHNICAL FIELD OF THE INVENTION

The invention relates generally to the framing industry, and more particularly to frames used to frame art, pictures, and the like.

PROBLEM STATEMENT

Interpretation Considerations

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Problem Statement is to be construed as prior art.

Discussion

Although frames can be purchased at mass merchandisers, persons often have a frame made at a frame shop so that they can purchase attractive framing of art, pictures and other items with the assistance of a professional framer. Frames frequently start out as sections of ornamental boards made of wood or other materials. The boards are cut to various lengths, with various angles at each end, so that the boards may be correctly positioned and attached together to form a frame of a predetermined shape. Framing itself is a profession that requires skill and training, and framers enjoy a status as artisans in their own right.

The artistic contribution to framing is separable from the engineering of a specific frame. In other words, the selection of a frame color or pattern contributes value—frequently more value—to the consumer than the actual cutting and creation of the frame. Further, the creation of the frame is a skill that must be mastered by each framer/artisan. Accordingly, it is desired to have a system, method, and device that allow a framer to engineer and build a frame of a desired size and dimensions quickly and reliably.

BRIEF DESCRIPTION OF THE DRAWINGS

Various aspects of the invention, as well as an embodiment, are better understood by reference to the following detailed description. To better understand the invention, the detailed description should be read in conjunction with the drawings in which:

FIG. 1 is a perspective view of a measuring instrument in its entirety as constructed according to the principles of this invention.

FIG. 2 is an exploded view of the measuring instrument shown in FIG. 1.

FIG. 3 is a fragmentary view of the measuring instrument shown in FIG. 1 in an assembled configuration.

FIG. 4 is an enlarged vertical taken on line 4-4 of FIG. 3.

FIG. 5 is a perspective view of a length of fillet molding showing the critical measuring distance.

FIG. 5*a* illustrates the relationship of the critical measuring distance and a mitering machine.

FIG. 6 is a partial plan view of one corner of a typical picture frame assembly.

FIG. 7 is a vertical view taken on line 84-84 of FIG. 6.

FIG. 8 is a partial enlarged vertical view taken on line 84-84 of FIG. 6.

FIG. 9 is a slightly modified configuration of FIG. 8.

FIG. 9*a* is a partial enlarged view of FIG. 9 showing a mat cut with a square end.

FIG. 10 is a slightly modified configuration of FIG. 9.

FIGS. 11 through 14 are views illustrating the use of the measuring instrument shown in FIG. 1 in its preferred embodiment.

EXEMPLARY EMBODIMENT OF A BEST MODE

Interpretation Considerations

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching").

Fourth, unless explicitly stated otherwise, conjunctive words (such as "or", "and", "including", or "comprising" for example) should be interpreted in the inclusive, not the exclusive, sense. Fifth, the words “means” and “step” are provided to facilitate the reader’s understanding of the invention and do not mean “means” or “step” as defined in §112, paragraph 6 of 35 U.S.C., unless used as “means for -functioning-” or “step for -functioning-” in the claims section. Sixth, the invention is also described in view of the Festo decisions, and, in that regard, the claims and the invention incorporate equivalents known, unknown, foreseeable, and unforeseeable. Seventh, the language and each word used in the invention should be given the ordinary interpretation of the language and the word, unless indicated otherwise.

Of course, the foregoing discussions and definitions are provided for clarification purposes and are not limiting. Words and phrases are to be given their ordinary plain meaning unless indicated otherwise.

Description of the Drawings

Referring to the drawings, wherein like numerals represent like parts throughout the several views, FIG. 1 illustrates the invention, which is a unitized adjustable measuring instrument broadly indicated as 75. The invention is adapted particularly for simplifying the difficult task of measuring the openings of picture frame mats, and then transferring those measurements to a mitering machine for the purpose of accurately cutting, to the proper length, a piece of picture frame fillet molding.

FIG. 1 shows a perspective view of the invention broadly indicated as 75. FIG. 2 of the drawings provides a fragmentary exploded perspective view of the invention broadly indicated at 75 showing all of its various components. The invention 75 includes at least a generally rectangular body, comprising a top plate 1 and a base plate 2. Top plate 1 and base plate 2 may be formed of any practical material, such as plastic or aluminum, for example.

Referring to FIGS. 1-3 the top plate 1 is comprised of through slots 8, and slot 8*a*, located along the length of the plate. The slots 8, 8*a* are preferably parallel to each other and are also preferably at a 45° angle relative to the slot 11 that traverses the length of the top plate 1. The slots 8, 8*a* are sized and located to accommodate hardware, which is shown and discussed below.

From FIG. 2, it can be seen that slots 8 and 8*a* are spaced to align with the threaded holes 14 and threaded hole 15 of base plate 2. Thus, as the under face 38 of top plate 1 abuts the top face 33 of base plate 2, the fasteners 10 traverse through threaded holes 14. The fasteners 10 are sized and shaped to produce a slight gap between the faces 38 and 33, as is apparent to those of skill in the mechanical arts. The gap between the plates 1, 2 allows for the top plate 1 and the base plate 2 to move independently of each other within the confines and restrictions created by the fasteners 10.

A locking feature 4 inserts through the slotted hole 8*a* of top plate 1 and the threaded hole 15 of base plate 2. When it is tightened, the locking feature 4 draws together of the top plate 1 and the base plate 2 at the surfaces 33 and 38, fixes/immobilizes the plates 1, 2. In practice, if the locking feature 4 is loosened slightly, then free and independent movement of the plates 1 and 2 is restored. The slot 11 of the top plate 1 is preferably a female dovetail-like shape. However, other shapes may be used as is apparent to those of skill in the art upon reading this disclosure.

FIG. 2 also shows that the end face 13 of top plate 1 and the end face 18 of base plate 2, are preferably angled at 45° relative to edge 12 of top plate 1, and edge 17 of base plate 2. In addition, the end faces 13, 18 transverse at a right angle in relation to the top surface 32 of top plate 1 and the surface 33 of base plate 2. The end faces 13, 18 are also at a 45° angle relative to the edge 31 of top plate 1 and the edge 34 of base plate 2. In addition, the end faces 13, 18 are configured so that when top plate 1 and base plate 2 are properly assembled, the end faces 13 and 18 are aligned in a manner that gives them the appearance of a single face. This is also illustrated in FIGS. 1 and 3.

A slide mechanism 3 is slideably mated to the top plate 1 by means of a male dovetail 30, which mates with the matching female dovetail 11. In addition, the slide mechanism 3 is mated to the top plate 1 by introducing the side 31 of top plate 1 into the slot 27 of the slide 3. The the male and female dovetails are designed so as to allow for a slightly loose fit, proving for an unrestricted movement along the length of top plate 1. Of course, although dovetails are discussed here, it will readily apparent to those of ordinary skill in the art upon reading the invention that variations of means for securing the slide mechanism 3 to the top plate 1 are available, and incorporated within the scope of the invention.

Referring to FIG. 4, a clearance is provided around the surfaces 32, 31, and 38 of top plate 1, by the adjacent surfaces 40, 41, and 39 of slide mechanism 3 broadly indicated in slot area 27. With the combination of the slightly loose fit established by the dovetail shapes 11 and 30, and the clearance present at the slot area 27, the slide mechanism 3 is allowed to move along the entire length of the top plate 1 without restriction. A threaded through hole 23 is incorporated in top surface 24 of slide mechanism 3 such that a locking feature 6 tightens to the top plate 1 and secures the slide 3 in place.

Referring again to FIG. 2, a locking feature 6 is screwed into the threaded hole 23. The threaded shaft 6*a* of the locking feature 6 is of sufficient length so as to allow for the content of the threaded shaft 6*a* with top surface 32 of the top plate 1. With continued tightening of the locking feature 6 the bottom face 38 of top plate 1 is forced against the surface 39 of the slot area 27 of slide mechanism 3. The force being adequate to immobilize slide mechanism 3 upon top plate 1 at any chosen location along the entire length of top plate 1. By slightly loosening the locking device 6, free movement of slide mechanism 3 is once again established.

A calibration device 9 incorporates a male dovetail 20, and locking feature 4, which has a similar geometry as the male dovetail 30 of slide mechanism 3. A threaded through hole 22 preferably transverses the vertical center of the calibration device 9. In operation, the male dovetail 20 of the calibration device 9 is introduced to the female dovetail 11 in top plate 1. Because of a slightly loose fit, the calibration device 9 moves freely along the length of top plate 1. The relative location of the calibration device 9 within the invention is shown in FIGS. 1 and 3. The screw 5 is screwed into the threaded hole 22 of the calibration device 9 and is of a sufficient length as to allow the screw to pass through the entirety of the device and make contact with surface 81 of top plate 1. With continued tightening of the adjusting screw 5, the calibration device 9 is forced in an upwardly direction and the male dovetail 20 of the calibration device 9 is eventually stopped by contacting surfaces 36 and 37 of the female dovetail like shape 11 of top plate 1. The calibration device 9 is securely immobilized at any given point along the length of top plate 1. By slightly loosening the screw 5, free movement of calibration device 9 along the length of the top plate 1 is re-established.

FIG. 5 illustrates a length of fillet molding 43, similar to that used for picture framing. Faces 46 and 47 (not visible) have been mitered at 45° relative to the edge 45. A rabbet 53 having a vertical face 48 and a horizontal face 50 extends longitudinally along the inside face 51 of fillet 43. In picture framing the craftsmen sizes the fillet molding to a predetermined mat opening so as to effectively create a four-sided frame 44 within the opening 82 and of mat 56 as seen in FIG. 6. To do this, a craftsman will take a measurement "at the rabbet". This measurement is indicated as 54 in FIG. 5, and also represents the length of the vertical face 48 of rabbet 53. The measurement 54 is also shown in FIGS. 6 and 12 as mat opening 82 because the fillet and mat should have approximately the same measurement 54. FIG. 6 illustrates the proper configuration of an assembled fillet broadly indicated at 44 within the opening 82 of mat 56 and artwork 55 and frame 57. FIG. 7 further illustrates the relative positioning of the assembled picture frame components at 84-84 of FIG. 6.

At this point it is briefly advantageous to briefly refer ahead. FIG. 11 shows a proper placement of a length of fillet 43 in practice of the invention. A locking feature 4 is slightly loosened so that the invention may be adjusted for an individual fillet molding. The dimension 96 between top plate 1 and base plate 2 is adjusted, in part, by sliding the plates relative to each other, as see in FIGS. 3 and 11. It is noted that the length of the dimension 96, a travel distance, is limited by the combination of the length of the slots 8 making contact with the fixed fasteners 10 as illustrated in FIG. 3.

This travel distance is established to accommodate the widths of the rabbet face 50 FIG. 5. The width of the rabbet face is shown in FIG. 5 as dimension 52, and in practice ranges from ⅛ inch to over ½ inch. The dimension 52 transfers the dimension 54 of FIG. 5 for most common mitering machines. The dimension 54 of fillet 43 increases or diminishes in direct relationship to the width of the rabbet 53 at dimension 52. This relationship is illustrated in FIG. 5*a*, which shows a partial graphic representation of a plan view of a mitering machine 90 with a length of fillet material 43 properly located proximate to the face 51, the face 51 making full contact with the fence 73 of the mitering machine, and the face 47 making full contact with the face 70 of stop bar 67. For the purpose of visual clarity the mitering machine is shown with the cutting means removed. Typically, the cutting means comprise either a set of sharp knife blades or saw blades, which cut simultaneously within an area broadly indicated at 88*a*, parallel to the surfaces 64 and 65. The mitering machine is comprised of a work surface 66, a fence 73, and a stop bar 67. The stop bar 67 has an upright surface 70, which is configured at approximately a 45° angle relative to the fence 73, so as to accommodate a matching 45° angle of surface 47 of the fillet work piece 43, which was previously cut along face 64.

For example, when the measured distance 54 along the face 48 of a fillet 43 (FIG. 5) needs to be 10 inches in length in order to fit a mat opening broadly indicated at 82 (FIG. 12) along surface 63. In FIG. 5*a*, the distance 54*b* represents the measured distance of 10 inches along the face 48*b*. The distance 52*b* is the minimum rabbet width which fillet molding is manufactured. If the fillet work piece 43 is to be cut along the face 65, the resulting mitered piece of fillet molding fits the mat opening. Distance 52*a* is the maximum rabbet width which fillet molding is manufactured. If the fillet work piece 43 is to be cut along the face 65 without a change being made to the positioning of the stop bar 67, the distance 54*a* along the face 48*a* is considerably short of the 10 inches needed. For the distance 54*a* to become the 10 inches needed, the stop bar 67 is adjusted a distance 91, which is the difference of the distances 54*a* and 54*b*. The distances 52*a* and 52*b* represent the maximum and the minimum rabbet widths of manufactured fillet molding material, respectively.

An individual fillet work piece has rabbet width 52 (clearest in FIG. 5) that ranges somewhere within the distance 91 (the rabbet width varies with each fillet molding). Referring once again to FIG. 11, a length of fillet 43 is positioned so as the underside 45 of the fillet is facing user, and the face 51 of the fillet is directionally facing the side face 12 of the top plate 1. Furthermore, surface 50 of the fillet (facing away) is in full contact with face 33 of base plate 2. In addition, face 48 (clearest in FIG. 5) of the fillet is in full contact with face 17 of base plate 2 as shown in FIG. 11. From another perspective, with top plate 1 upon the base plate 2, the side face 12 of the top plate 1 will eventually come into contact with face 51 of fillet molding 43. The act of holding top plate 1 and base plate 2 firmly together between the fingers of the left hand will hold the plates 1 and 2 in this position. By next removing and putting aside fillet 43, it is then an easy task to tighten locking device 4 with the right hand. The invention is now set and sized to a particular molding 43.

Referring to FIG. 12, a mat 56 and a center opening broadly indicated at 82 comprising the four sides 60, 61, 62, and 63 is shown in proper relationship to the invention. With the locking device 6 slightly loosened, and the slide 3 positioned so as to fit within the opening 82 of mat 56, the placing of the bottom surface 58 (facing away) of the calibration device 9, and also to insure a contact of side 63 of mat 56 with face 21 of calibration device 9 and by then maintaining this relationship of mat 56 and the device 9 with the right hand, it is then an easy task for the user to slide the slide 3 to the left, so as to accomplish a contact of side 62 of mat 56 with the face 25 of slide 3, and also a contact of side 63 of mat 56 with face 29 of slide 3, and then tighten locking feature 6. The accurate measurement of the distance 54 of the mat opening 82 is now complete and is the distance 54 for the length of the fillet molding 43 (FIG. 5) that will fit along the sides 61 and 63 of mat 56 FIG. 12. The measuring procedure of the mat opening side 60 and 62 of mat 56 is the same as for the side 61 and 63 of mat 56. Once the locking feature 6 is tightened, the invention is set to the measured opening and is now ready for the craftsman to transfer that information to the mitering machine.

FIG. 13 shows a graphic representation of a plan view broadly indicated at 88 of a double cut mitering machine comprising the miter cutting area broadly indicated at 88*a*, material support surface 66, fence 73, and slide stop and locking device broadly indicated at 69. For the purpose of visual clarity, the cutting apparatus comprising of either a set of sharp knife blades or saw blades is not shown (however, anyone skilled in the art of picture framing will readily identify the components represented upon reading the present disclosure). If the mitering machine being used is a guillotine chopper, the blades must be moved to the farthest forward position so as to allow for a length of fillet molding to be totally mitered in a single cut.

With the slide stop and locking device 69 moved to the right as to avoid interference with other elements, the invention is positioned on the mitering machine in a manor that first locates the slide 3 within the miter cutting area 88*a*, and the surface 35 of the bottom plate 2 (FIGS. 2-4) resting upon the work surface 66, and the side 17 of base plate 2 having complete contact with the fence 73. While maintaining the described relationship of machine and invention, the operator is to slide the invention to the right until the face 28 of slide 3 (also shown in FIGS. 2-4) comes into contact with the face 65 of the mitering opening 88a. While maintaining the invention in this position with the left hand, the user slides the slide stop and locking device 69 to the left by the use of the right hand until the face 70 of stop bar 67 comes into contact with the face 13 of top plate 1 and the face 18 of base plate 2. After insuring that all surfaces previously described are making appropriate contact, tighten locking device 68 by means of turning handle 68a. The mitering machine is now set and after the removal of the invention, an appropriate length of fillet molding material can be miter cut to the setting in a conventional manner familiar to any user skilled in the art of picture framing.

Once the invention has been adjusted to an individual fillet work piece according to the procedure outlined in FIG. 11 so as the distance 96 of (FIG. 3) matches the distance 52 (FIG. 5) of a fillet, and the invention is further adjusted to an individual mat opening according to the procedure outlined in FIG. 12, and the invention is placed upon a mitering machine broadly indicated at 88 according to the procedure outlined in FIG. 13, the function and cooperation of the parts of the invention with a mitering machine can be explained.

The face 19 of calibration device 9 and the face 25 of slide 3 being parallel to one another and on the same horizontal plane, and furthermore having a distance between each other being of the same length as the measured distance 54 of the mat opening. The face 28 of the slide 3 is configured at the matching 45° angle of the face 65. Referring simultaneously to FIGS. 2, 4, and 14 one can see that the face 28 extends beyond the bottom surface 35 of the bottom plate 2 at a narrow step 94. Referring once again to FIG. 13 the extended length of the face 28 at 94 comes into contact with the face 65 of the mitering machine preventing the invention from any further movement to the right, as long as the surface 17 of the invention is firmly against the fence 73 of the mitering machine. By viewing along the face 65 it can be seen that the face 65, distance 54, and face 12 converge. The face 28 aligns the invention along the face 65 so as to match that converging point. Some measuring stop bars (the stop bar here is shown as stop bar 67) extend well over an inch in thickness off the work surface 66. Because of this, the face 19 of the calibration device 9 could not be aligned to match the point that the distance 54 would ideally intersect on face 12, so the calibration device 9 is located away from the point of interference with the face 70 to a distance which still allows for adjustment to individual mitering machines. By the offsetting of the face 25 of the slide 3 the same distance that the calibration device 9 was moved to avoid the interference with the stop bar 67, the measuring distance 54 is achieved.

By comparing the following elements of FIG. 5 and FIG. 13, the cooperation of all of the parts of the invention, a fillet, and a mitering machine can be seen. The face 51 corresponds to face 17, the face 48 corresponds to the face 12, the distance 52 corresponds to the distance 96, the face 47 corresponds to the face made up of 13 and 18, the face 46 corresponds to the projected face 28, and therefore, when the distance between the faces 19 and 25 are set to the distance 54 of any given mat opening, that distance 54 will be transferred to the mitering machine resulting in a mitering machine resulting in a nearly perfect match of the distance 54 with any fillet work piece measured with this invention.

FIG. 14 shows a graphic representation of a plan view of a single cut mitering saw broadly indicated at 89 comprising an open blade cutting area broadly indicated at 71, material support surface 66, fence 73, and slide stop with locking device broadly indicated at 69. Also shown is the invention related to the mitering saw. For the purpose of visual clarity the motor and saw blade are not shown. The measuring stop and locking device 69 are positioned on the fence 73 to the left of the saw blade cutting area 71 as illustrated. A first miter cut is made in a length of fillet material on the end, which has a face 47 in FIG. 5. Once the first miter cut has been made, the miter saw is located in the position shown in FIG. 14. With the measuring stop and locking mechanism 69 moved to the left to avoid interference, the invention is placed on the support surface 66 with the locking device 6 in an upward direction and the face 28 of slide 3 making contact with side 72 of the blade arc 71, and the further contacting of the entire length of face 17 of the base plate 2 against the fence 73.

Maintaining the described location of the invention with the right hand, a user slides the slide stop and locking device 69 to the right with the left hand until the surface 70 of stop bar 67 comes into contact with the face 18 of base plate 2 and the face 13 of top plate 1. Next, the user tightens locking device 68 by turning handle 68a with the left hand. After removal of the invention an appropriate length of the fillet molding material can be cut in a conventional manner familiar to any user skilled in the art of picture framing.

Thus, there are three different mitering machines described which incorporate similar function and hardware. But each machine, no matter how precisely constructed, will still have its individual tolerances and hardware. Add to this the elements of various blade widths, modifications made by the owner, and the age of the machine, and it is apparent that existing measuring device cannot work on every machine. However, the present invention can. Once calibrated, no further adjustment will be required when the invention is used on that particular machine.

Calibration

Referring to FIG. 3 a calibration device 9 can be moved along the dovetail like shaped tract 11 of top plate 1 to either the right or left by slightly loosening the adjusting screw 5. An adjustment to the left will add to the length of measured dimension 54 (see FIG. 5). An adjustment to the right will decrease the length of the measured dimension 54. How this adjustment works can be explained further by referring to FIG. 13. It has been established in the previous explanation of the cooperation of the invention, fillet, and machine that the distance between face 19 and face 25 is the same as the measured distance 54 of a fillet and mat opening, and that after adjustments are correctly made, a cut along the surface 65 would provides the desired results.

However, no mitering machine will cut on the face 65 (it will cut parallel to the face). The distance between the face 65 and where the blade makes its cut can be over ¼ of an inch. Whatever that distance might be, the fillet molding is an excessive length when cut. Thus, it is necessary to bring the plain of the cut to align itself with the face 65 of the mitering machine in order to maintain the merging point of face 12, measuring distance 54, and the face 65. That adjustment will result in the relocation of the slide top bar 67 to the left, which will shorten the length of the fillet. The face 28 of the slide 3 should rest against the face 65.

Thus, to create a condition that will relocate the slide top bar 67 to the left, while maintaining the position of the slide 3, the entirety of the body of the invention (having been adjusted to a particular fillet work piece) is moved to the left the distance between the face 65 and cutting plain of the individual mitering machine. The further the slide 3 is moved to the left along the body if the invention, the longer the fillet work piece will be. So to shorten a length of fillet material the slide 3 must be moved to the right. Referring to FIG. 12 one can see that if the slide 3 is to move to the right, along the body of the invention and still maintain the measured distance 54, the calibration device 9 must also move to the right. This principle works in the opposite for the lengthening of a fillet molding. The tightening of the adjusting screw 5 will maintain the position of the calibration device 9. The user can make ever smaller incremental adjustments to the invention to achieve the desired precision required in the area of fillet molding use.

FIG. 8 shows an optimum configuration where the vertical face 48 of fillet 43 and the mat 56 touch at 83 and 82. Vertical face 48 and the horizontal face 50 form a junction at 49. The junction 49 runs the entirety of the length of the fillet 43 (FIG. 5). The craftsman uses this junction 49 to obtain a measured length 54 (FIG. 5).

FIGS. 9 and 10 illustrate two variations of measuring a length that a fillet molding needs to be in order to provide a quality fit within the opening of a mat. FIG. 9 shows a slightly modified configuration of FIG. 8 at face 48, which is, angled surface 48*a* angling in a direction away from horizontal surface 50 at junction point 49. FIG. 10 shows the same configuration of FIG. 9 with the exception that the angled face 48*a* in FIG. 9 is shown as a rounded face at 48*b*. FIGS. 8, 9, and 10 show at 59 the reverse angle that mats typically employ. One purpose for this configuration is that if the mat is cut with a square edge such as the square edge 59*a* of FIG. 9*a*, the junction point 49 prevents the point 82 of mat 56 from making contact with the surface 48*a* at point 83 (of FIG. 9) and surface 48*b* at point 83 (of FIG. 10).

Thus, the craftsman is working to achieve the configuration illustrated at 83 and 82 in FIG. 8. If, however, a length of fillet material is cut to the measured length 54 (FIG. 5) along the junction line 49 of the fillets illustrated in FIGS. 9 and 10, the fillet will be cut to an insufficient length and upon assembly of all four of the parts 43 (FIG. 6), creates a finished fillet frame having a loose fit which is unacceptable and will also render the fillet material as wasted. So it is a common practice for one skilled in the art of picture framing to add to the measured length 54 of FIG. 5 to prevent the possibility of cutting the fillet material to an insufficient length.

The craftsman now makes several length adjustments in very small increments so as to make each of the four sides of the fillet frame 44 FIG. 6 acquire the desired condition shown at 82 and 83 FIG. 8 (interestingly, this is one of the reasons the cost of adding the fillet element to a picture frame is so expensive—the labor to create this custom fit is excessive even to one with talent and experience). This invention solves this problem, particularly via means of an angled chamfer 16 on base plate 2 (FIG. 4). The point 91 of base plate 2 runs the length of the base plate 2 and is geometrically located as to make contact with the 83 of faces 48, 48*a*, and 48*b*, thus eliminating the need for repeated adjustment to the length of the fillet material.

Though the invention has been described with respect to a specific preferred embodiment, many variations and modifications will become apparent to those skilled in the art upon reading the present application. It is therefore the intention that the appended claims and their equivalents be interpreted as broadly as possible in view of the prior art to include all such variations and modifications.

The invention claimed is:

1. An apparatus, comprising:

a generally trapezoidal top plate having a length, a first edge parallel to a second edge along the length, a first end, and an angular end face that forms a first 45-degree interior angle with the first edge, a plurality of slots traversing through the top plate, and a securing cut routed the length of the plate and parallel to the edges;

a generally trapezoidal base plate having a length, a first edge parallel to a second edge along the length, a first end, and an angular end face that forms a first 45-degree interior angle with the first edge, and a plurality of holes located such that when the top plate and base plate are placed one on top of the other such that the end faces are in alignment the holes and slots are also in alignment;

the top plate separatable from and coupled to the bottom plate via a plurality of fasteners such that a fastener passes through each slot and is secured into each hole;

a calibration device having a cross-section having the same shape as a cross section of the securing cut, the calibration device mated into the securing cut and held in place via an adjusting screw that tightens into the securing cut;

a first fastener being a locking feature passing through the slot nearest to the end face and secured in the hole nearest to the end face;

a slide mechanism mated to the top plate via the securing cut, the slide mechanism comprising a securing cut male member that securably fits within the securing cut and is capable of sliding in the securing cut;

a face having a slot that runs through the length of the slide mechanism that securably fits about the edge of the top plate, and is capable of sliding over the edge;

a top surface that couples the face to the securing cut male member, the top surface having a hole that accepts a locking feature, the locking feature capable of fixing the position of the slide mechanism relative to the top plate.

2. The device of claim 1 wherein the securing cut is a dovetail.

3. The device of claim 1 wherein the first end is straight and at right angles to the edges.

4. The device of claim 1 wherein the slots are elongated and are parallel with the end face.

5. The device of claim 1 wherein the holes of the base plate are threaded holes.

6. The device of claim 1 wherein the slide mechanism face has a 45-degree angle with respect to the securing cut male member.

* * * * *